United States Patent [19]

Sawato

[11] Patent Number: 5,050,711
[45] Date of Patent: Sep. 24, 1991

[54] ELECTROMAGNETIC BRAKE APPARATUS

[75] Inventor: Tatsuya Sawato, Nagoya, Japan

[73] Assignee: Mitsubishi Denki Kabushiki Kaisha, Tokyo, Japan

[21] Appl. No.: 493,732

[22] Filed: Mar. 15, 1990

[30] Foreign Application Priority Data

Mar. 16, 1989 [JP] Japan .................................. 1-64200

[51] Int. Cl.⁵ .............................................. B60L 7/00
[52] U.S. Cl. .................... 188/164; 188/73.2; 188/163; 188/218 XL; 192/84 C; 310/76; 310/77; 318/372
[58] Field of Search ...................... 188/161, 164, 73.2, 188/218 XL, 163; 192/84 A, 84 B, 84 C; 310/75 R, 76, 77; 318/372

[56] References Cited

U.S. PATENT DOCUMENTS

| | | | |
|---|---|---|---|
| 2,739,683 | 3/1956 | Gamundi | 192/84 A |
| 2,840,195 | 6/1958 | Holton | 188/218 R |
| 3,941,221 | 3/1976 | Pringle | 188/218 XL |
| 4,570,767 | 2/1986 | Kumatani . | |

FOREIGN PATENT DOCUMENTS 62-55389 11/1987 Japan .
62-56753 11/1987 Japan .

OTHER PUBLICATIONS

*Patent Abstracts of Japan*, No. 57-16569, "Electromagnetic Coupling Device", 141 E 106.
*Patent Abstracts of Japan*, No. 57-16570, "Electromagnetic Coupling Device", 141 E 106.

Primary Examiner—George E. A. Halvosa
Attorney, Agent, or Firm—Burns, Doane, Swecker & Mathis

[57] ABSTRACT

A stationary brake member (45) which is used in an electromagnetic brake apparatus, comprises a first press-worked plate (45h) and a second press-worked plate (45m) which are laminated to each other. The second press-worked plate (45m) has plural hooks (45q), (45s) to grip the first press-worked plate (45h). The first press-worked plate (45h) has plural projections (45k) with spaces (45t) therebetween, and the projections are buried in the cast bracket (31), whereby the first press-worked plate (45h) is firmly fixed to the bracket (31).

5 Claims, 3 Drawing Sheets

ELECTROMAGNETIC BRAKE APPARATUS

FIELD OF THE INVENTION AND RELATED ART STATEMENT

1. Field of the Invention

The present invention relates to an electromagnetic brake apparatus. More particularly, the present invention relates to a stationary brake disc or stationary shoe member which is used in the electromagnetically driven brake device, such as a brake in a sewing machine.

2. Description of the Related Art

An electromagnetic brake apparatus is constructed that a rotary member of a brake is slidable on an output shaft by electromagnetically actuating an exciter coil so as to be coupled magnetically to a stationary member of the brake whereby the output shaft is braked.

In the conventional apparatus, the stationary member of a brake is firmly fixed to a bracket of the electromagnetic brake apparatus when casting the bracket. The stationary brake member has protrusion and recess for engaging with the bracket. The protrusion and recess for engagement are formed by grinding with a lathe. The grinding of the stationary brake by the lathe is expensive, since it needs man and hour and expensive cutting bite.

OBJECT AND SUMMARY OF THE INVENTION

An object of the present invention is to offer an improved electromagnetic brake apparatus wherein stationary member of a brake is manufactured by press working and in low production cost, and is fixed firmly to a bracket of a housing of the electromagnetic brake apparatus.

In order to achieve the above-mentioned object, the electromagnetic brake apparatus of the present invention comprises:

a stationary brake member of ferromagnetic substance which passes magnetic flux which is generated by an exciter coil, having;

(a) a first press-worked plate having engaging means which protrudes toward into and buried in a cast bracket, and (b) a second press-worked plate laminated with the first press-worked plate by engaging its outside edge and its inside edge of said first press-worked plate.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Hereafter, a preferred embodiment of the present invention is described with reference to the accompanying drawings of FIG. 1–FIG. 3.

Figure 1:
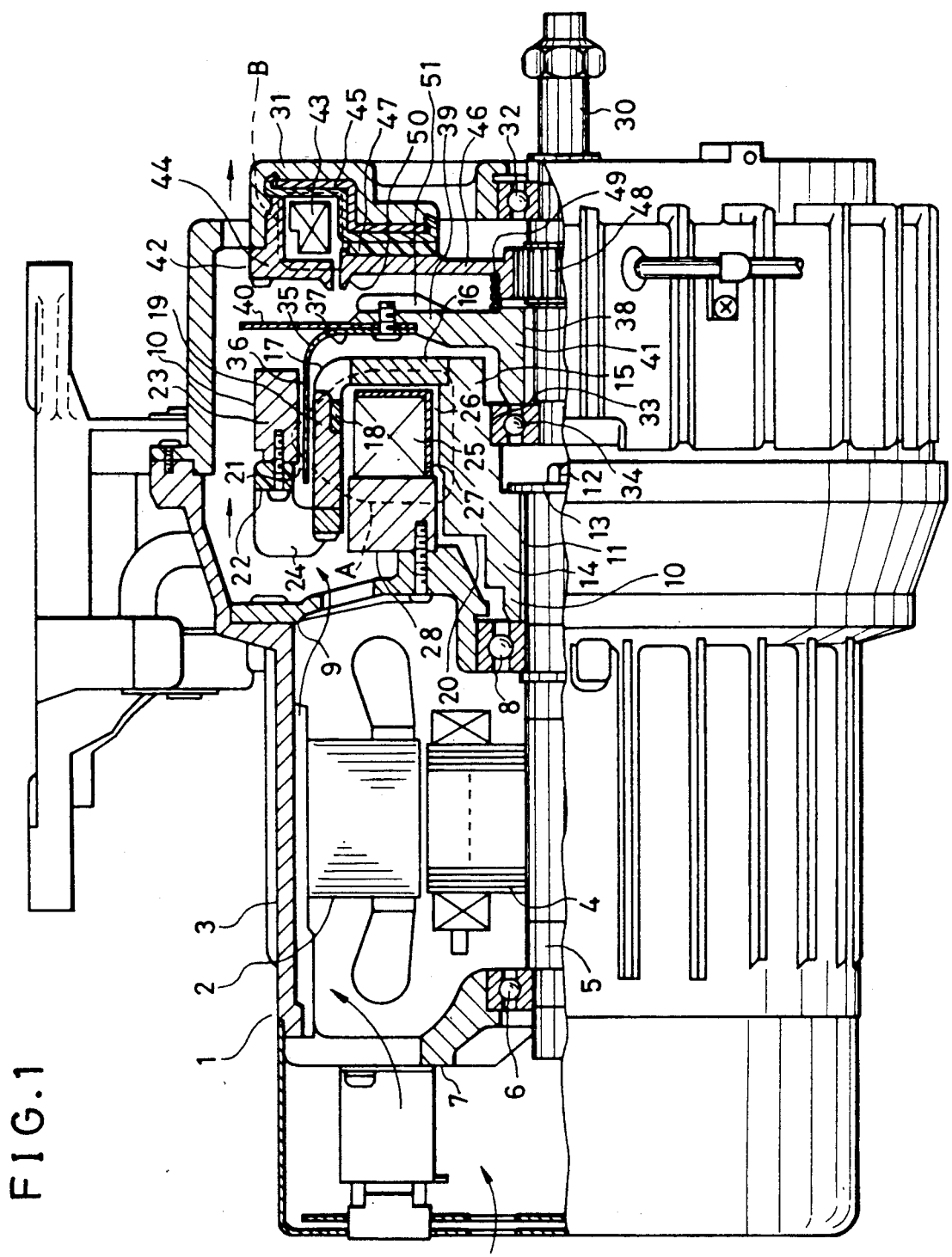
FIG. 1 is a fragmental side elevation view showing particularly inside structure of the upper half portion of an embodiment of the electromagnetic brake apparatus of the present invention.

FIG. 1 is a fragmental side elevation view showing particularly inside structure of the upper half portion of the embodiment of a clutch motor having an electromagnetic brake apparatus of the present invention. In FIG. 1, a housing 1 of the motor has an outer frame 3 fixing a stator 2 thereto, a first bracket 7 fixing thereto a bearing 6 for rotatably holding one end of a rotary shaft 5 of a rotor 4 and a second bracket 9 fixing thereto a bearing 8 for rotatably holding a midway part of the rotary shaft 5.

A driving rotary body 10 is fixed to the other end of the rotary shaft 5. The driving rotary body 10 comprises a magnetic pole unit 20 having U shaped section. The U shaped section comprises a horizontal part 15, a vertical part 16, plural first magnetic members 17 and second magnetic members 19. The horizontal section 15 includes a fixing member 14 which is connected to the rotary shaft 5 by a key 11 and a stopper disc 13, which is fixed to the rotary shaft 5 by a bolt 12. The vertical section 16 is radially extended from an end part of the horizontal section 15. The first magnetic members 17 are projected from the circumference of the vertical section 16 like fingers in substantially parallel direction to the rotary shaft 5. And, the second magnetic members 19 are positioned between the first magnetic members 17 alternately, and a small space inbetween. The second magnetic members 19 and the first magnetic members 17 are fixedly connected by a ring 18 made of non-magnetic material, and the driving rotary body 10 includes a first body 23 to serve as a magnetic path. The first body 23 is formed in a concentric circle around a circumference of the first and the second magnetic members 17, 19, with a predetermined small gap 21 inbetween. And, the first body 23 is fixed to the second magnetic member 19 by a supporter 22 of non-magnetic material.

Therefore, the driving rotary body 10, which consist of the magnetic pole unit 20 of U-shaped section, the supporter 22 and the first body 23, is formed to have an S-shaped section, as shown in FIG. 1. The driving rotary body 10 serves as a magnetic path, and also serves as a flywheel. The supporter 22 made of non-magnetic material has plural ribs 24 which are provided radially to the circumference of the supporter 22, and connected to the second magnetic members 19. The plural ribs 24 also serves as blades for flowing cooling air shown by arrows in FIG. 1.

An exciter coil 25 held by a coil frame 27 is embraced by the magnetic unit 20 with a small gap therebetween. The exciter coil 25 is mounted on the second bracket 9 through the coil frame 27 and a second body 28 which is for forming a magnetic path. An output shaft 30 is rotatably held by a pair of bearings 32, 34 with its axis on the same line as that of rotary shaft 5. The bearing 32 is supported by a third bracket 31 fixed to the housing 1. The other bearing 34 is supported by a hole 33 bored in the horizontal section 15 of the magnetic unit 20. An eddy current member 35 is made by a draw-pressing a thin conductive material to a cup shape. A cylindrical part 36 of the eddy current member 35 is positioned in a gap 21 between the magnetic members 17, 19 and the first body 23 with a small gap therebetween. A vertical part 37 i.e. the bottom part of the eddy current plate 35 is connected to a disc 39, together with a cooling wheel 40 for cooling the eddy current plate 35 in a thermal conductive manner therebetween. The disc 39 is formed to extend in a radial direction from the output shaft 30. The disc 39 is fixed to the output shaft 30 by its boss 38. The disc 39 also includes a fin 51 for blowing cooling air. The eddy current member 35, the disc 39, boss 38 and the cooling wheel 40 together constitute a driven rotary body 41 in the electromagnetic clutch.

A second exciter coil 43 of an electromagnetic brake 42 is embraced in a yoke 44 and a stationary brake member 45. The yoke 44 is fixed to the third bracket 31 by bolts. The stationary brake member 45 is fixed to the third bracket 31 during casting of the third bracket 31, which is made of aluminum.

Periphery of a disc-shaped brake armature 46 is positioned facing the yoke 44 with a small circular gap therebetween as shown in FIG. 1, and the stationary brake member 45 is disposed facing the disc-face of the brake armature 46. The brake armature 46 constitutes a part of a magnetic path which is generated by the second exciter coil 43. And, the brake armature 46 has a friction plate 47, such as a cork, which is arranged to face the stationary brake member 45. The brake armature 46 is connected to the output shaft 30 through a spline 48 in a manner to be slidable in an axial direction of the output shaft 30 and non-rotatable thereon. A compression spring 49 is mounted on the output shaft 30 between the brake armature 46 and the boss 38 of the driven rotary body 41. The brake armature 46 lightly contacts the stationary brake member 45 by the force of the compression spring 49 to prevent the undesirable rotation of the output shaft 30 together with the rotary shaft 5 owing to mechanical loss of the bearing 34 when the first exciter coil 25 is de-energized. When the magnetic flux generated by excitation of the second exciter coil 43 passes to the brake armature 46 through the yoke 44 and the stationary brake member 45, the brake armature 46 is drawn to the stationary brake member 45. As a result, the electromagnetic brake 42 generates braking force by strong contact between the friction plate 47 and the stationary brake member 45.

Figure 2:
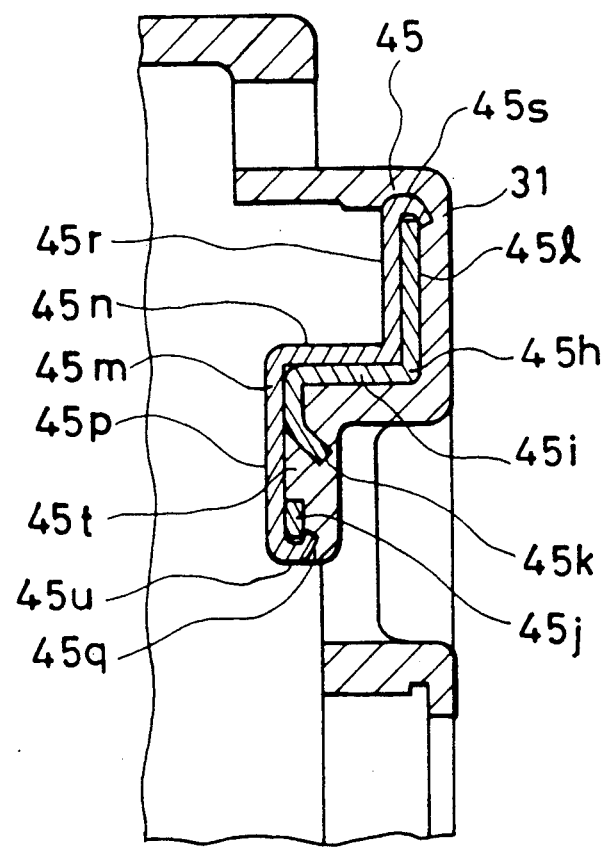
FIG. 2 is a cross sectional side view showing a part of a configuration fixing a stationary member of a brake to a bracket in an electromagnetic brake apparatus of the embodiment of FIG. 1.
Figure 3:
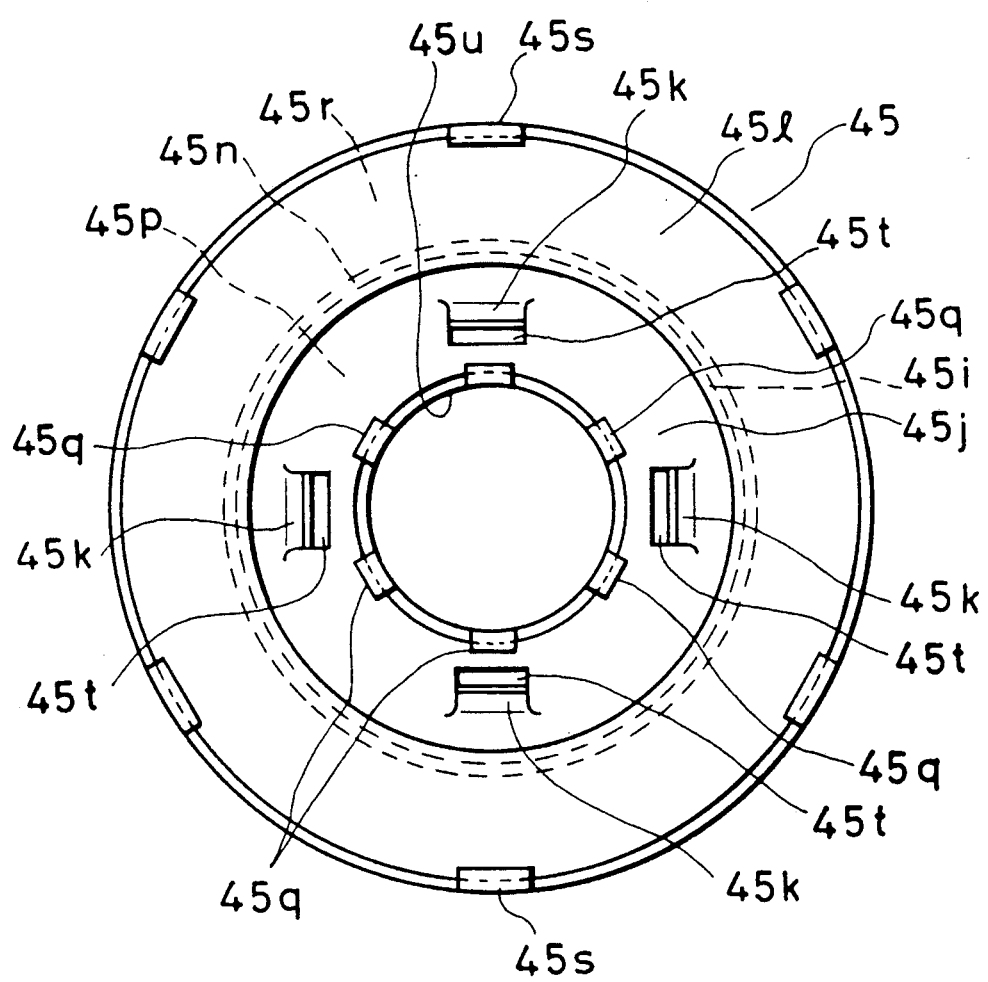
FIG. 3 is a plan view of the whole stationary member of the brake which is shown in FIG. 2 as a part.

The following is the detailed description of the stationary brake member 45 shown in FIG. 2 and FIG. 3. FIG. 2 is a cross sectional side view showing a part of a configuration fixing a stationary brake member to the third bracket 31. FIG. 3 is a plan view of the whole stationary brake member 45 which is shown in FIG. 2.

The stationary brake member 45 comprises a pair of press-worked plates 45h, 45m, both having disc shapes. The first and second press-worked plates 45h, 45m which are made of iron, or the like ferromagnetic substance, such as cold-rolled carbon steel, are made by press working. The first press-worked plate 45h has a first brim part 45l, a first cylinder part 45i and a first bottom part 45j. The first bottom part 45j has a through-hole at the center thereof, and has four projections 45k which are formed by cutting and raising up small parts of the first bottom part 45j in a direction of the right side in FIG. 2. Thus, four spaces 45t are provided by raising up the cut part of the first bottom part 45j as the projections 45k. When the third bracket 31 is made by casting metal, such as aluminum, the spaces 45t are filled up with the cast material of the third bracket 31. As a result, the first pressed plate 45h is fixed firmly to the third bracket 31.

The second pressed plate 45m has a second brim part 45r, a second cylinder part 45n and a second bottom part 45p. The second bottom part 45p has a center through-hole 45u at the center as shown in FIG. 3. The second bottom part 45p has six first hooks 45q which are provided on the inside edge thereof at the circumference of the through-hole 45u. The second brim part 45r of the second pressed plate 45m has also six second hooks 45s which are provided on the outside edge of the second brim part 45r. The second hooks 45s grip the outside edge of the first brim part 45l of the first pressed plate 45h. And, the first hooks 45q grip the inside edge of the first bottom part 45j of the first pressed plate 45h as shown in FIG. 2. Accordingly, the first pressed plate 45h and the second pressed plate 45m are piled up and fixed integrally to each other, to constitute the stationary brake member 45.

Starting a load: In the embodiment of the electromagnetic brake apparatus of the present invention, when the rotor 4 is driven by feeding current in the windings of the stator 2, the driving rotary body 10 which is fixed to the rotary shaft 5 is driven. In this circumstance, by actuation of the first exciter coil 25, a magnetic flux is generated. The magnetic flux flows through the first magnetic member 17, the first body 23 and the second magnetic member 19 of the driving rotary body 10, as shown by a broken line A in FIG. 1. Thus, the magnetic flux A crosses the eddy current member 35 of the driven rotary body 41. And eddy current is generated in the eddy current member 35. Accordingly, the driving rotary body 10 and the driven rotary body 41 are coupled by electromagnetic force induced by the eddy current. As the result of that, the output shaft 30 which is fixed to the driven rotary body 41 through the boss 38, is driven. A load, such as a sewing machine which is connected to the output shaft 30 can be accelerated rapidly in a short time driven.

Stopping the load: When the first exciter coil 25 is deenergized under the condition described above, the driving rotary body 10 and the driven rotary body 41 become de-coupled. At the time, the second exciter coil 43 is fed with a braking current, with the result that a magnetic flux is generated through the yoke 44, an upper part (in FIG. 1) of the stationary brake member 45 and the circumference of the brake armature 46, as shown by a broken line B in FIG. 1. And, the brake armature 46 slides toward the stationary brake member 45 to be brought into contact with the surface of the stationary brake member 45 thereby effecting braking. Thus, revolution of the output shaft 30 rapidly ceases to stop the actuation of the load.

In the above-mentioned condition that the second exciter coil 43 is excited, the magnetic flux passes through the stationary brake 45, more to the detail, the first and second brim parts 45l, 45r and the first and second cylinder parts 45i, 45n. Then, a left side face of the second bottom part 45p in FIG. 2 works as friction face for braking function when the friction plate 47 of the brake armature 46 is brought into contact with the stationary brake member 45.

As described above, according to the present invention, the stationary brake member 45 which is made by press-working comprises the first and the second pressed plates 45h, 45m which are laminated firmly by plural hooks 45q, 45s. Accordingly, the stationary brake member 45 is made without a grinding step which has been necessary in manufacturing the conventional stationary brake member. And, the use of the above-mentioned press-worked stationary brake member 45 decreases the production cost because of elimination of the conventional lathe working.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An electromagnetic brake apparatus comprising:
   a yoke fixed to a bracket;
   a stationary brake member having a through-hole at the center thereof, which is fixed integrally to said bracket facing said yoke, and including
   (a) a first press-worked plate having a first cylinder part, a first bottom part which defines said through-hole, which extends from one end of said first cylinder part, and which includes plural engaging members raised toward an inside of said first cylinder part, and a first brim part which extends from an other end of said first cylinder part, and
   (b) a second press-worked plate having a second cylinder part which is laminated on said first cylinder part of said first pressed-worked plate, a second bottom part which defines said through-hole, which extends from one end of said second cylinder part, and which includes plural first hooks for gripping an inside edge of said first bottom part which forms said through-hole, and a second brim part which extends from an other end of said second cylinder part and which includes plural second hooks for gripping an outside edge of said first brim part along an outside edge of said second brim part;
   a rotatable armature which is connected to an output shaft;
   means for rotating said armature while said stationary brake member is maintained in a stationary position; and
   an exciter coil which is positioned between said yoke and said stationary brake member to magnetically bring said armature into frictional contact with said stationary brake member to stop said rotation of said armature.

2. An electromagnetic brake apparatus, comprising:
   a bracket;
   a stationary brake member of ferromagnetic substance which passes magnetic flux, including
   (a) a first press-worked plate having engaging means which protrude into and are buried in said bracket, and
   (b) a second press-worked plate laminated with said first press-worked plate by engagement of its outside and inside edges with said first press-worked plate;
   a rotatable element;
   means for rotating said element while said stationary brake member is maintained in a stationary position; and
   means for magnetically bringing said element into frictional contact with said second press-worked plate to stop said rotation of said element.

3. An electromagnetic brake apparatus in accordance with claim 2, wherein said first press-worked plate is firmly fixed by a material of said bracket which is filled in a space of said first press-worked plate defined by said engaging means.

4. An electromagnetic brake apparatus in accordance with claim 2, wherein said second press-worked plate is engaged with said first press-worked plate by gripping edges of said first press-worked plate.

5. An electromagnetic brake apparatus in accordance with claim 2, wherein said first press-worked plate is cast-fixed to said bracket.

* * * * *